United States Patent [19]

Iimura et al.

[11] Patent Number: 4,475,245
[45] Date of Patent: Oct. 2, 1984

[54] TRANSCEIVER

[75] Inventors: Takashi Iimura; Masaki Yanagihara; Kouji Yokota, all of Tokyo, Japan

[73] Assignee: Trio Kabushiki Kaisha, Tokyo, Japan

[21] Appl. No.: 465,633

[22] Filed: Feb. 10, 1983

[30] Foreign Application Priority Data

Feb. 17, 1982 [JP] Japan ............................. 57-20004[U]

[51] Int. Cl.$^3$ ............................................. H04B 1/40
[52] U.S. Cl. ....................................... 455/73; 455/156; 455/226
[58] Field of Search ...................... 455/67, 73, 85, 154, 455/156, 226, 227; 375/7, 10

[56] References Cited

U.S. PATENT DOCUMENTS

| | | | |
|---|---|---|---|
| 2,083,239 | 6/1937 | Oosterhuis et al. | 455/156 |
| 2,310,304 | 2/1943 | McCoy et al. | 455/156 |
| 2,409,845 | 10/1946 | Gardiner et al. | 455/226 |
| 2,809,288 | 10/1957 | Gilbert | 455/156 |
| 3,676,781 | 7/1972 | Worcester | 455/156 |

Primary Examiner—Marc E. Bookbinder
Attorney, Agent, or Firm—Gerald J. Ferguson, Jr.; Joseph J. Baker

[57] ABSTRACT

An improvement in a transceiver having first and second carrier frequency oscillators for demodulation, a change-over device for making change-over of oscillation outputs between the first and second carrier frequency oscillators, a mixer for mixing the oscillation outputs from the first and second carrier frequency oscillators, and a switching circuit for connecting and disconnecting the input signal into, or output signal from, said mixer by on-off operations of the telegraphic transmission key to apply the signal to a low frequency amplifier of the transceiver.

1 Claim, 1 Drawing Figure

TRANSCEIVER

BACKGROUND OF THE INVENTION

1. Field of the Invention

This invention relates to improvement in a transceiver.

2. Description of the Prior Art

Conventional transceiver were accompanied with a disadvantage such that a transmission frequency of one party's station was difficult to be matched with a transmission frequency of the other party's station during CW operation. To accomplish such transmission frequency matching, much experience was needed. And also the frequencies of a received sound and a CW monitor signal could not be made variable simultaneously.

SUMMARY OF THE INVENTION

The present invention has been made in view of those disadvantages inherent in the conventional transceivers as mentioned above, and aims at providing an improved transceiver which is capable of readily matching the transmission frequencies between one party's station and the other party's station at the time of the CW operation, and making the frequencies of the received sound and the CW monitor signal variable simultaneously, thereby eliminating those undesirable shortcomings as experienced in the known devices.

According to the present invention in general aspect of it, there is provided a transceiver of a construction having first and second carrier frequency oscillators for demodulation; change-over means for making change-over of oscillation outputs between said first and second carrier frequency oscillators; a mixer for mixing the oscillation outputs from said first and second carrier frequency oscillators; and a switching circuit for connecting and disconnecting the input signal into, or output signal from said mixer by on-off operations of the telegraphic transmission key to apply the signal to a low frequency amplifier of the transceiver.

The foregoing object, other objects, as well as specific circuit construction, operating principle and the resulting effect of the present invention will become more apparent and understandable from the following detailed description thereof, when read in conjunction with the accompanying drawing.

BRIEF DESCRIPTION OF THE DRAWING

In the drawing, a single

DETAILED DESCRIPTION OF PREFERRED EMBODIMENTS

Figure 1:
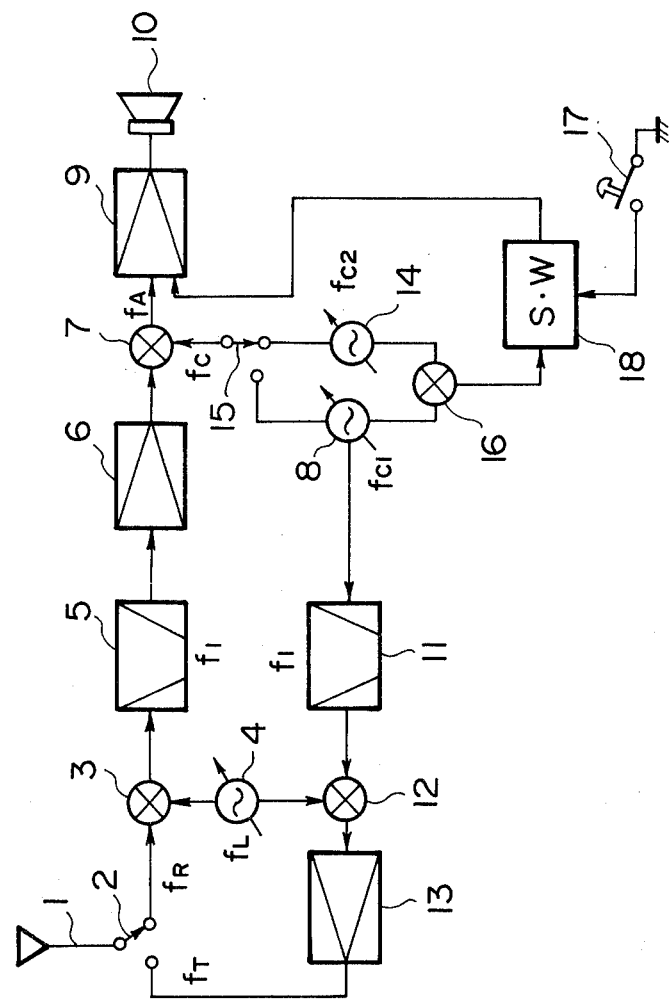
FIG. 1 is a block diagram showing one embodiment of the transceiver according to the present invention.

In the following, the present invention will be described in detail with reference to a preferred embodiment thereof shown in FIG. 1.

In the drawing, a reference numeral 1 designates an antenna, a numeral 2 refers to an antenna switching circuit for changing over the antenna 1 from signal transmission to reception, or vice versa, 3 represents a mixing device constituting a frequency up-conversion circuit jointly with a local oscillator 4, 5 denotes an intermediate frequency band-pass filter, 6 refers to an intermediate frequency amplifier, 7 a demodulator as a frequency down-convertor, 8 the first carrier frequency oscillator, 9 a low (audio) frequency amplifier, and 10 a loud speaker. These circuit components make up a receiving circuitry for the transceiver. A numeral 11 refers to a band-pass filter, a reference numeral 12 designates a mixer which constitutes a frequency conversion circuit jointly with the local oscillator 4, and 13 a transmission amplifier. These circuit components make up a transmitting circuitry with a part thereof being in common use with the receiving circuitry.

In addition, the embodiment of the transceiver according to the present invention is provided with a second carrier frequency oscillator 14, and a change-over switch 15 between the first carrier frequency oscillator 8 and the demodulator 7 so as to select either of an oscillation output of the first carrier frequency oscillator 8 or an oscillation output of the second carrier frequency oscillator 14 by means of the change-over switch 15 for feeding the selected oscillation output into the demodulator 7. Another mixer 16 is also provided for mixing the oscillation output from the first carrier frequency oscillator 8 and that from the second carrier frequency oscillator 14. An output signal from the mixer 16 is applied to the low frequency amplifier 9 through a switching circuit 18 which functions to turn on and off the output signal from the mixer 16 by the on-off operations of the key 17 for the CW transmission, and a beat sound produced by the output signals from the mixer 16 and the demodulator 7 is taken out of the loud speaker 10.

The frequency of the local oscillator 4 is varied by tuning dial operation, the frequency of the first carrier frequency oscillator 8 is adjustably set at a predetermined frequency and the frequency of the second carrier frequency oscillator 14 can be adjusted by manual operation means.

In the above-described construction of the embodiment according to the present invention, the transmission and reception frequencies are determined by an oscillation frequency of the local oscillator 4, and the oscillation frequency of the second carrier oscillator 14 has no bearing on the transmission and receiving frequencies of the transceiver.

Assume now that the receiving frequency is $f_R$, the transmission frequency is $f_T$, the oscillation frequency of the local oscillator 4 is $f_L$, the oscillation frequencies of the carrier frequency oscillators 8 and 14 are respectively $f_{C1}$ and $f_{C2}$, and the central frequencies of the band pass filters 5 and 11 are $f_I$. The frequency $f_L$ of the oscillator 4 and the frequency $f_{C1}$ of the oscillator 8 have a relation defined by the following equation.

$$f_L = f_0 + f_{C1}$$

where $f_0$ denotes frequency-graduations (scales) of a tuning dial in the transceiver, which stands for $f_R$ at the time of the signal reception, and for $f_T$ at the time of the signal transmission.

Considering now the signal reception circuit, for following relationship is established:

$$f_I = f_L - f_R$$

$$f_A = |f_I - f_C|$$

where $f_C$ denotes a carrier frequency to be introduced into the demodulator 7 through the change-over switch 15. When the oscillation output of the first carrier frequency oscillator 8 is selected by the change-over switch 15, $f_C$ becomes equal to $f_{C1}$ ($f_C=f_{C1}$), hence the following relationship is established:

$$f_A = |f_L - f_R - f_{C1}|$$
$$= |f_0 + f_{C1} - f_R - f_{C1}|$$
$$= |f_0 - f_R|$$

When frequency-graduation $f_0$ is dialed at the receiving frequency $f_R$, $f_A$ becomes zero.

That is, the frequency of sound at speaker 10 becomes zero. This means that there is no sound at speaker 10 when the transceiver is tuned to the reception frequency $f_R$ became sound can be produced by AC component of a signal.

On the other hand, considering the signal transmission circuit, since $f_I$ is equal to $f_{C1}$ ($f_I=f_{C1}$), the following relationship is established:

$$f_T = f_L - f_I$$
$$= f_L - f_{C1}$$
$$= f_0$$
$$= f_R.$$

That is to say, when the so-called "zero-beat" is adopted for the receiving frequency $f_R$, $f_T$ becomes equal to $f_R$ ($f_T=f_R$), and the transmission and reception frequencies come into agreement. When the oscillation output of the first carrier frequency oscillator 8 is selected by the change-over switch 15, the "zero-in" by the conventional zero-beat method becomes feasible.

The above mentioned method, however, can not provide high precision tuning. Generally speaking, human ears have not sensitivity to signals of very low frequencies under 50 Hz. Accordingly, an operator will find no-sound condition when $f_A$ is in the range of ±50 Hz. In other words, the above mentioned tuning method has a non-sensible range of ±50 Hz.

In case the oscillation output of the second carrier frequency oscillator 14 is selected by the change-over switch 15 for reception, since this oscillator does not constitute the reception frequency determining factor, the output signal at the speaker 10 can be received at a desired reception beat frequency by varying the oscillation frequency $f_{C2}$ of the second carrier frequency oscillator 14. The oscillation frequency $f_{C2}$ of the second carrier frequency oscillator 14 has been selected to be different by $\Delta f_C$ from the oscillation frequency $f_{C1}$ of the first carrier frequency oscillator 8 when the zero beat is taken. $\Delta f_C$ is audio-frequency. That is, the reception beat frequency produced at mixer 7 can be represented as follows because $f_I$ is equal to $f_{C1}$ when the transceiver is tuned to $f_R$:

$$f_{C2} - f_I = f_{C2} - F_{C1} = \Delta f_C.$$

Thus, the reception beat frequency becomes $\Delta f_C$. This signifies that a desired reception beat frequency can be obtained by varying the oscillation frequency of the carrier frequency oscillator 14. Unless the transceiver is tuned to $f_R$ ($f_0 \neq f_R$), the beat frequency $f_A$ produced at mixer 7 is not equal to $\Delta f_C$ because $f_I \neq f_{C1}$.

The oscillation outputs of the first and second carrier frequency oscillators 8, 14 are mixed in the mixer 16, an output signal with the difference frequency $\Delta f_C$ between them is produced at the mixer 16 and the output signal from the mixer 16 is applied to the audio frequency amplifier 9 through the switching circuit 18. In this case, since the switching circuit 18 opens and closes in association with the on-off operations of the key 17 to apply the outputs from the mixer 16 to the audio frequency amplifier in an on-and-off way, an output can be obtained from the loud speaker 10 in accordance with the on-off operations of the key 17, thereby making it possible to utilize the device as the CW transmission monitor. Furthermore, when the frequency $f_A$ of received sound is made coincident with that $\Delta f_C$ of the CW transmission monitor by varying the oscillation frequency of the local oscillator 4, the transceiver is tuned to the reception frequency $f_R$ and the transmission frequency $f_T$ can be matched with the reception frequency $f_R$. That is, in this instance, a frequency to be represented by the following equation is applied to the audio frequency amplifier 9 from the demodulator 7:

$$f_A = f_I - f_C(f_L - f_R) - f_{C2}$$
$$= f_0 + f_{C1} - f_R - f_{C2}$$
$$= f_0 - f_R + \Delta f_C.$$

When the oscillation frequency $f_L$ of the local oscillator 4 is adjusted to render $f_0$ to be equal to $f_R$ ($f_0=f_R$), $f_A$ is equal to $\Delta f_C$ ($f_A=\Delta f_C$). On the other hand, since the frequency of the signal to be applied to the audio frequency amplifier 9 through the switching circuit 18 is $f_{C2}-f_{C1}=\Delta f_C$, irrespective of $f_L$, the frequencies of the two signals applied to the audio frequency amplifier 9 come into agreement, and no beat sound output is produced from the loud speaker 10. Accordingly, if the key 17 is brought to its "on" state, and the oscillation frequency of the local oscillator 4 is controlled so as to eliminate the beat sound from the loud speaker 10, the transceiver is tuned to the reception frequency and also both transmission frequency and the reception frequency can be made coincident. This suggests that the "zero-in" reception by the so-called "double beat method" is feasible.

In tuning operation, the operator is hearing two mono-tone sounds from speaker 10, the frequency of one mono-tone sound being $f_A$ and the frequency of the other being $\Delta f_C$. When the transceiver is tuned to the reception frequency $f_R$, $f_A$ becomes equal to $\Delta f_C$. At that time, the operator can recognize that two mono-tone sounds coincide with each other in frequency. This method can provide high precision tuning. When the frequency difference between two mono-tone sounds approach to each other at a few herz, they generate howling which is sensible to the operator. When the two mono-tone sounds completely coincide with each other, such howling disappears. Accordingly, the operator can dial the transceiver with high precision. And also, the frequency $f_{C2}$ of the oscillator 14 can be arbitrarily changed without affecting other transceiver circuit operations. The change of $f_{C2}$ will change $f_A$, as well as $\Delta f_C$, simultaneously. Accordingly, it is possible to select any desirable frequency of the two mono-tone sounds which the operator likes.

In the embodiment shown in FIG. 1, the output signal of the mixer 16 is turned on and off in conjunction with the operations of the key 17. However, it should also be noted that the monitor sound can be turned on and off by making and breaking of the input signal into the mixer 16.

As has been explained in the foregoing, the transceiver of the present invention is constructed with the first and second carrier frequency oscillators for demodulation; the mixer for introducing, as input thereinto, oscillation outputs from both first and second carrier frequency oscillators; the switching circuit for applying the input or output signal of the mixer to the low frequency amplifier by the on-off operations of the key for the CW transmission; and a change-over means for changing over the oscillation outputs of the first and second carrier frequency oscillators to apply a selected oscillation output to the demodulator. With such construction of the transceiver according to the present invention, the beat frequency of the reception sound and the frequency of the CW transmission monitor can be made variable simultaneously, whereby the transmission and reception of the signals can be effected with desired reception beat frequency and CW transmission monitor frequency.

Moreover, besides the zero-in reception by the so-called "zero-beat" method, such zero-in reception can be effected by only matching the reception beat frequency with the CW monitor frequency, hence easy and accurate telegraphic operations can be put into practice.

What is claimed is:

1. A transceiver including: a transmission section and a receiver section comprising a demodulator means for supplying an audio signal to an audio amplifier and reproduction device; first and second carrier frequency oscillators; change-over means coupled to said first and second oscillators to select an output of one of said first and second carrier frequency oscillators and applying said output to said demodulator means; a mixer for mixing the oscillation outputs from said first and second carrier frequency oscillators; and a switching circuit for connecting and disconnecting the output signal from said mixer in response to on-off operations of a CW key to apply said mixer output signal to said audio frequency amplifier and reproduction device of the transceiver.

* * * * *